US007617997B2

(12) United States Patent
Nagai

(10) Patent No.: US 7,617,997 B2
(45) Date of Patent: Nov. 17, 2009

(54) ELECTROSTATIC COATING SYSTEM

(75) Inventor: Kimiyoshi Nagai, Yokohama (JP)

(73) Assignee: Ransburg Industrial Finishing K.K., Kanagawa (JP)

( * ) Notice: Subject to any disclaimer, the term of this patent is extended or adjusted under 35 U.S.C. 154(b) by 0 days.

(21) Appl. No.: 10/944,250

(22) Filed: Sep. 17, 2004

(65) Prior Publication Data

US 2005/0040262 A1 Feb. 24, 2005

Related U.S. Application Data

(63) Continuation of application No. PCT/JP2004/010872, filed on Jun. 23, 2004.

(30) Foreign Application Priority Data

Jul. 24, 2003 (JP) ............................ 2003-279163

(51) Int. Cl.
*A01G 23/10* (2006.01)

(52) U.S. Cl. ....................... 239/690; 239/691; 239/703; 239/706; 118/712; 118/620

(58) Field of Classification Search ......... 239/690–708; 361/227–228, 42–49; 324/452–457; 118/620–629, 118/712
See application file for complete search history.

(56) References Cited

U.S. PATENT DOCUMENTS

| | | | | |
|---|---|---|---|---|
| 4,997,130 | A * | 3/1991 | Weinstein | 239/222 |
| 5,199,650 | A * | 4/1993 | Ishibashi et al. | 239/691 |
| 5,632,816 | A * | 5/1997 | Allen et al. | 118/629 |
| 5,908,162 | A * | 6/1999 | Klein et al. | 239/691 |
| 6,423,143 | B1 * | 7/2002 | Allen et al. | 118/621 |
| 2003/0064167 | A1 | 4/2003 | Mauchle | |

FOREIGN PATENT DOCUMENTS

| | | |
|---|---|---|
| JP | 02-298374 | 12/1990 |
| JP | 04-349956 | * 12/1992 |
| JP | 09-262507 | 10/1997 |
| JP | 9-262510 | 10/1997 |
| JP | 09-262510 | * 10/1997 |
| JP | 9-267057 | 10/1997 |
| JP | 2002-143726 | 5/2002 |
| JP | 2002-186884 | 7/2002 |

OTHER PUBLICATIONS

Supplementary European Search Report for corresponding European Patent Application No. EP 04748080 dated Aug. 20, 2007.

* cited by examiner

*Primary Examiner*—Dinh Q Nguyen
(74) *Attorney, Agent, or Firm*—Kilyk & Bowersox, P.L.L.C.

(57) ABSTRACT

Total supplied current ($I_2$) and high voltage ($V_m$) supplied to a rotary atomizer head (5) are detected by a total current sensor (115) and a high voltage sensor (116). Total leak current ($I_2$) in paint paths, thinner paths and air paths inside an electrostatic atomizer (2) is detected via a metal back plate (40) of the electrostatic atomizer (2). When the total leak current value ($I_2$) exceeds a threshold value ($I_a$), the level $V_m$ of the high voltage applied to the rotary atomizer head (5) is lowered stepwise.

15 Claims, 8 Drawing Sheets

Control of Work Current

ELECTROSTATIC COATING SYSTEM

The present application is a continuation of International Patent Application No. PCT/JP2004/010872, filed Jun. 23, 2004 (incorporated herein by reference), which in turn claims priority from Japanese Patent Application No. JP2003-279163, filed Jul. 24, 2003.

FIELD OF THE INVENTION

This invention relates to an electrostatic coating system including an electrostatic atomizer.

BACKGROUND OF THE INVENTION

Electrostatic coating systems including an electrostatic atomizer, in general, are configured to electrically charge paint particles with a high voltage generated by an external or built-in high voltage generator (typically of a cascade type) such that the charged paint particles are attracted onto a work held in a ground potential. The high voltage to be applied is changed in voltage value depending upon the nature of the paint to maintain the normal voltage of the atomizer at a predetermined value (for example, −90 kV).

To keep the safety of operators, conventional electrostatic coating systems include a safety mechanism for interrupting operation of the high voltage generator and thereby stopping application of the high voltage before accidental short-circuiting occurs when the atomizer excessively approaches the work. More specifically, conventional coating systems include an overcurrent detector for detecting excessive current flowing in a high voltage cable in the atomizer. If the overcurrent detector detects a current exceeding the maximum value of the normal current (for example, 200 μA), the high voltage generator interrupts the supply of the high voltage to stop the coating operation.

However, if the interruption of the coating operation occurs during coating of a work, it will invite a great economical loss especially in case the work is an expensive product such as a vehicle body.

There are some existing electrostatic coating systems including safety mechanisms and additionally having certain means for minimizing interruption of coating operations.

One of such existing coating systems is disclosed in Japanese Laid-open Publication H9(1997)-262507. Since the leak current increases with humidity of the coating atmosphere, this prior art monitors the humidity of the coating atmosphere to lower the sensitivity of the safety mechanism. That is, when the humidity of the coating atmosphere is high, this system does not interrupt the power supply to the high voltage generator and continues the coating operation even if a current larger than the maximum normal current value flows.

Another of such existing coating systems is disclosed in Japanese Patent Laid-open Publication H2(1990)-298374. The safety mechanism for interrupting the supply of a high voltage in this coating system has an additional function of continuously monitoring the current flowing in its high voltage application path. If the safety mechanism detects a current larger than the maximum normal current value, it automatically lowers the output voltage of the high voltage generator to keep the current value within the range of the normal current.

Another of such existing coating systems is disclosed in Japanese Patent Laid-open Publication 2002-186884. This prior art remarks some problems including substantial decrease of the high voltage to be applied to the atomizer, which often occur when contamination of the atomizer by the paint or other substances increases the leak current. Thus, this prior art proposes to integrate amplitude values of the current or voltage in the high voltage application path and to generate an alarm to the operator's attention when the integrated value exceeds a preset value.

The above-introduced proposal of Japanese Patent Laid-open Publication No. H2(1990)-298374, namely, the proposal to automatically lower the output voltage of the high voltage generator upon detection of a current larger than the maximum normal current value, has the following advantage. Even when leakage of current occurs via a bridge made by a metal component contained in the paint, for example, the operator can continue the coating operation under a lower level of the high voltage applied to the atomizer and a reduced level of leak current as long as the reduced level of leak current is not likely to invite serious accidents such as fire.

Electrostatic atomizers using a rotary atomizer head typically use an air motor to drive the rotary head. Spray-type electrostatic atomizers typically use air to spray the paint. These electrostatic atomizers are subjected to leakage of electric current through dust or other contaminates in air paths. In some electrostatic atomizers having a built-in high voltage generator, the high voltage generator generates a high voltage inside the atomizer, and there is only a small distance between the high voltage generator and the rotary atomizer head (there is only a small distance of insulation). As a result, a small amount of dust or other contaminates, if any in the paint path, may become a source of leakage of electric current with a high probability. Therefore, although the coating system disclosed in Japanese Paten Laid-open Publication 2002-186884 can monitor the leak current and can generate an alarm when the leakage reaches an excessive level, it is difficult for operators to locate the very position of the leakage.

SUMMARY OF THE INVENTION

It is therefore an object of the invention to provide an electrostatic coating system capable of continuing coating operation even under considerable electrical leakage.

A further object of the invention is to provide an electrostatic coating system enabling an operator to immediately locate the source of electrical leakage inside the atomizer.

A still further object of the invention is to provide an electrostatic coating system including a safety mechanism for interrupting the supply of a high voltage under a dangerous condition to keep safety of operators and capable of optimizing the control of interruption of the power supply by the safety mechanism.

Electrical leakage inside an electrostatic coating system occurs most often in paint paths and air paths. Taking it into consideration, according to the first aspect of the invention, there is provided an electrostatic coating system including an electrostatic atomizer for coating a work with a paint electrically charged by application of a high voltage, comprising:

leak detecting means for detecting electrical leakage in an internal air path of the electrostatic atomizer; and voltage control means supplied with a signal from the leak detecting means to lower the level of the high voltage when electrical leakage occurs in the internal air path.

According to another aspect of the invention, there is provided an electrostatic coating system including an electrostatic atomizer for coating a work with a paint electrically charged by a high voltage, comprising:

leak detecting means for detecting electrical leakage in an internal paint path of the electrostatic atomizer; and voltage control means supplied with a signal from the leak detecting means to lower the level of the high voltage when electrical leakage occurs in the internal paint path.

The electrostatic atomizer preferably has a plate of a conductive material, which preferably defines the back surface of the electrostatic atomizer. The conductive back plate preferably has ports individually communicating with paths of the paint, air and cleansing liquid. In this case, the total electrical leakage (typically the total leakage of current) in the paint path, air path and cleansing liquid path inside the atomizer can be detected through the conductive back plate. For example, the total leak current can be detected by connecting a resistor in the grounding line of the conductive back plate. The leakage of electrical power may be detected either in voltage value or in current value. If an excessive total amount of electrical leakage is detected, the high voltage applied to charge the paint is preferably reduced gradually to an optimum value.

More preferably, leakage of electricity is detected in individual paths independently such that the very position of the leakage can be located easily. Electrical leakage in individual paths inside the electrostatic atomizer can be detected by individually grounding the ports in the conductive back plate and connecting independent resistors in the individual grounding lines. Here again, leakage of electricity may be detected either in current value or in voltage value.

In case the leakage of electricity is detected independently in individual paths, one or more of the paths less liable to invite serious accidents are preferably disregarded or weighted by a value smaller than 1 for the control by the safety mechanism to interrupt application of high voltage. In the present application, disregarding the leakage or weighting the leakage by less than 1 is sometimes referred to as lowering the sensitivity to leakage in such paths. Thus, the control by the safety mechanism can be optimized to assure safety of the electrostatic coating system while minimizing interruption of the coating operation.

The invention is suitable for application to both electrostatic coating systems including rotary atomizer heads and spray type electrostatic coating systems. Furthermore, the invention is applicable to electrostatic coating systems including external charging electrodes for use with electrically conductive paint (typically, water paint) as well.

DETAILED DESCRIPTION OF THE INVENTION

Embodiments of the invention will now be explained below with reference to the drawings.

First Embodiment

FIGS. 1-7

Figure 1:
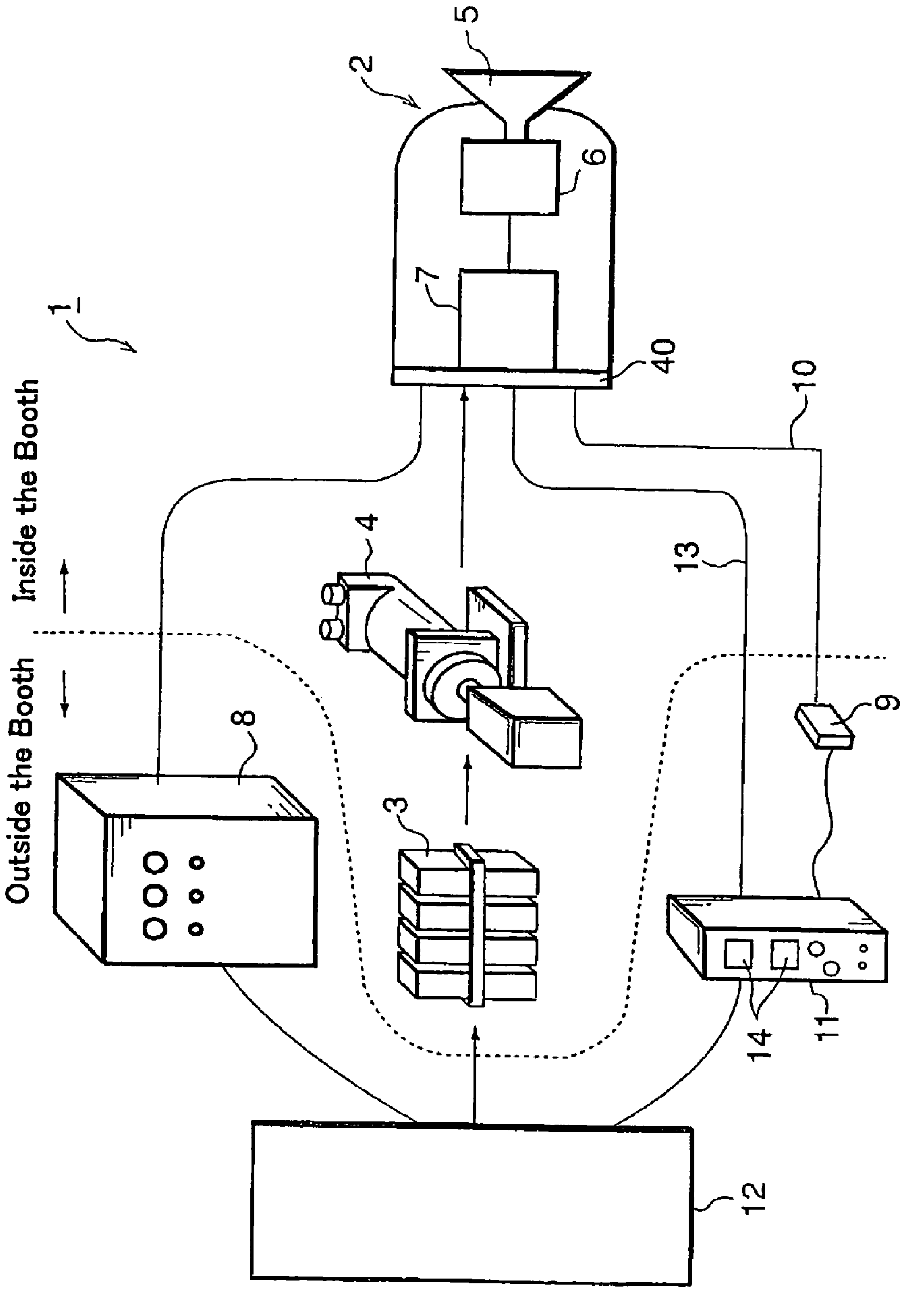
FIG. 1 is a diagram schematically showing the entire electrostatic coating system according to the first embodiment of the invention.

FIG. 1 shows a coating system 1 including an electrostatic atomizer 2 according to the first embodiment of the invention. The coating system 1 has a built-in high voltage generator circuit. The coating system 1 is typically incorporated in a coating line (not shown) of vehicle bodies. The atomizer 2 is of a rotary atomization type, and it is attached to a distal end of a robot arm (not shown). The paint supply system for dispensing paint to the electrostatic atomizer 2 includes a color change valve 3 and a paint pump 4.

The electrostatic atomizer 2 includes an air turbine 6 for driving a rotary atomizer head 5 and a high voltage generator 7. A high voltage generated in the high voltage generator 7 is applied to the rotary atomizer head 5 that substantially functions as an electrode of the electrostatic atomizer 2. Air in the coating system, including air for driving the air turbine 6 and shaping air, is controlled by an air controller 8. Voltage of the electrostatic atomizer 2 and revolution of the rotary atomizer head 5 are controlled by a controller 11 connected to the electrostatic atomizer 2 via a fiber amplifier 9 and an optical fiber cable 10.

Figure 5:
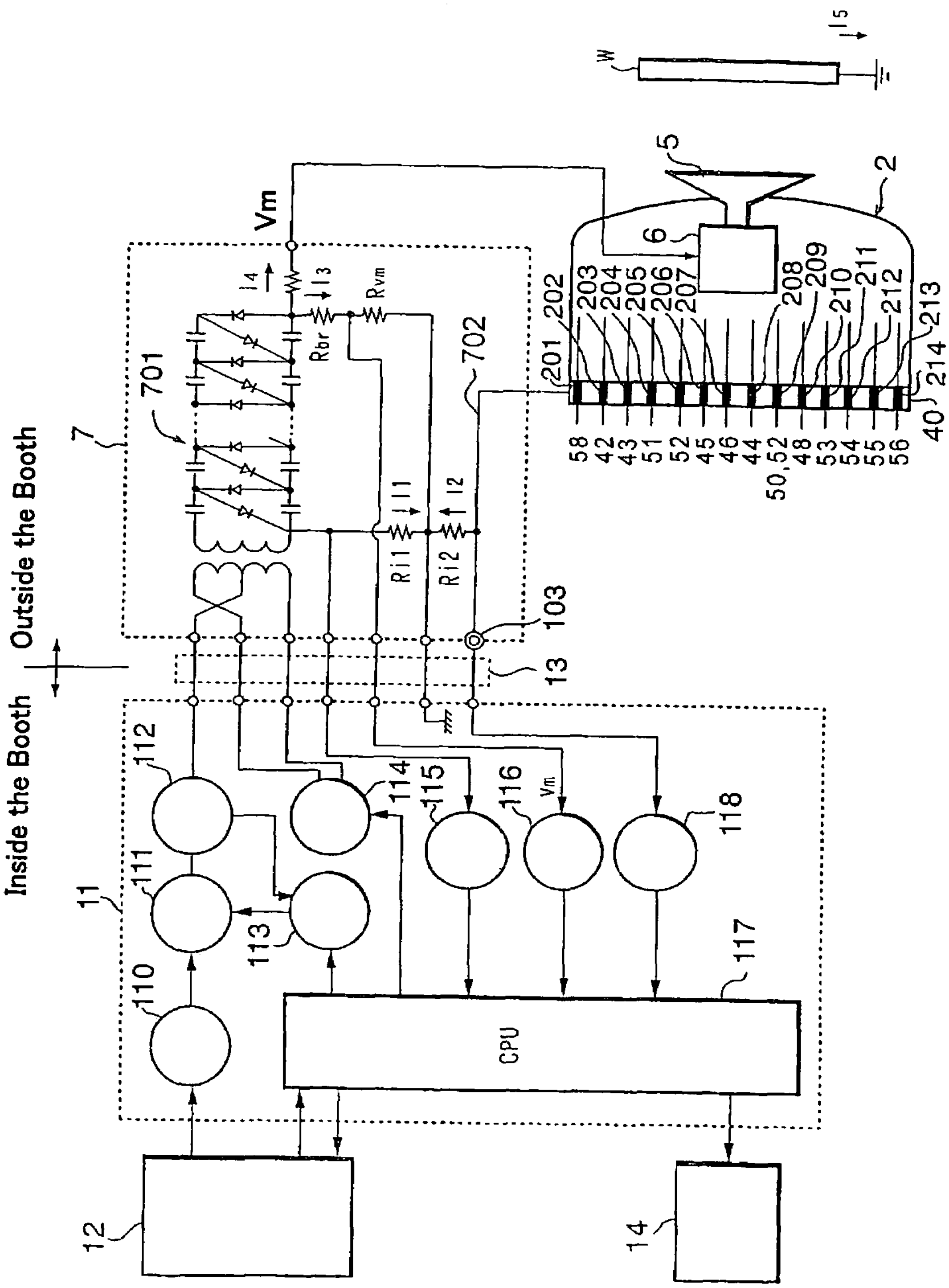
FIG. 5 is a diagram showing the entire electrical system in the electrostatic coating system according to the first embodiment.

As shown in FIG. 1, the electrostatic atomizer 2, color change valve 3 and paint pump 4 are located inside a coating booth in the coating line. The air controller 8, controller 11 and fiber amplifier 9 are located outside the coating booth. The air controller 8 and the controller 11 are connected to a coating line control device 12 that controls the entire coating line. As shown in FIGS. 1 and 5, the controller 11 includes a display 14 for giving necessary information to operators.

Figure 2:
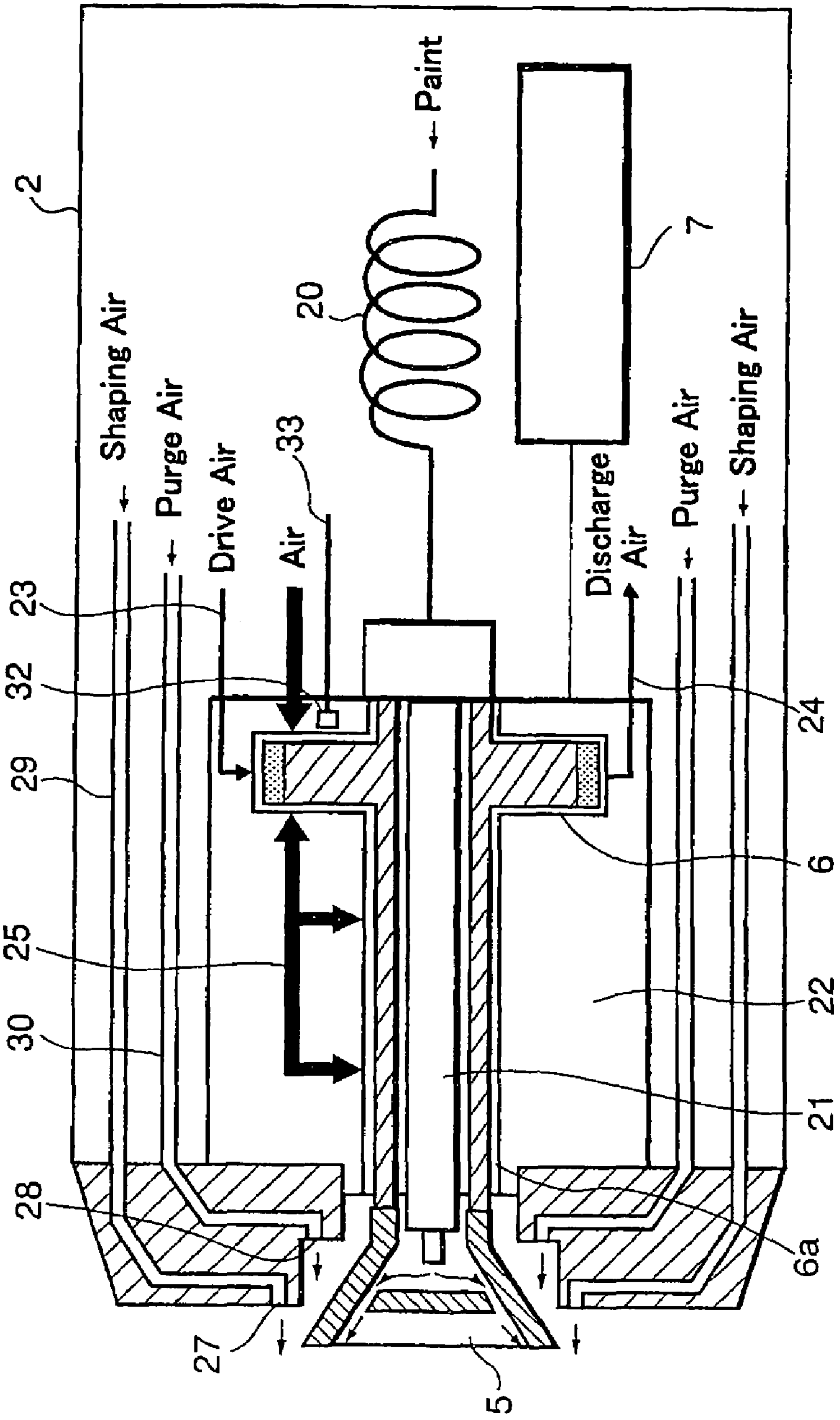
FIG. 2 is a diagram schematically showing the internal structure of an electrostatic atomizer used in the electrostatic coating system according to the first embodiment.

With reference to FIG. 2 schematically showing the internal structure of the electrostatic atomizer 2, the electrostatic atomizer 2 has a paint supply path 21 including a helical tube 20 as its part adjacent to the high voltage generator (typically of a cascade type) 7 in a rear region of the electrostatic atomizer 2. The paint supply path 21 extends along the axial line of the electrostatic atomizer 2 and dispenses paint to the rotary atomizer head 5.

As already explained, the electrostatic atomizer 2 includes the air turbine 6 known in the art. The output shaft **6*a* of the air turbine 6 is connected to the rotary atomizer head 5, and the rotary atomizer head 5 is driven to rotate with the rotary power from the air turbine 5. The air turbine 6 is housed in a turbine housing 22. The turbine housing 22 has formed a turbine air supply path 23, turbine air exhaust duct 24 and bearing air supply path 25 for a bearing that supports the output shaft 6*a* of the air turbine 6** in a floating condition.

The electrostatic atomizer 2 has a shaping air outlet 27 and a purge air outlet 28 both adjacent to the rotary atomizer head 5. The electrostatic atomizer 2 includes, inside, a shaping air path 29 for conveying air to the shaping air outlet 27 and a purge air path 30 for conveying air to the purge air outlet 28.

Revolution of the rotary atomizer head 5 is detected by a revolution sensor 32 that detects revolution of the air turbine 6. Output of the revolution sensor 32 is supplied to the external controller 11 via an optical fiber cable 33 extending inside the electrostatic atomizer 2, and it is used to control the revolution of the rotary atomizer head 5.

The electrostatic atomizer 2 has a RIM thinner outlet at a position adjacent to the rotary atomizer head 5 and a nose flush outlet that opens at a central position of the rotary atomizer head 5. Both the RIM thinner outlet and the nose flush outlet are well known in the art, and are therefore omitted from illustration. The electrostatic atomizer 2 has further paths, not shown, provided to convey cleansing thinner to the RIM thinner outlet and the nose flush outlet omitted from illustration.

Figure 3:
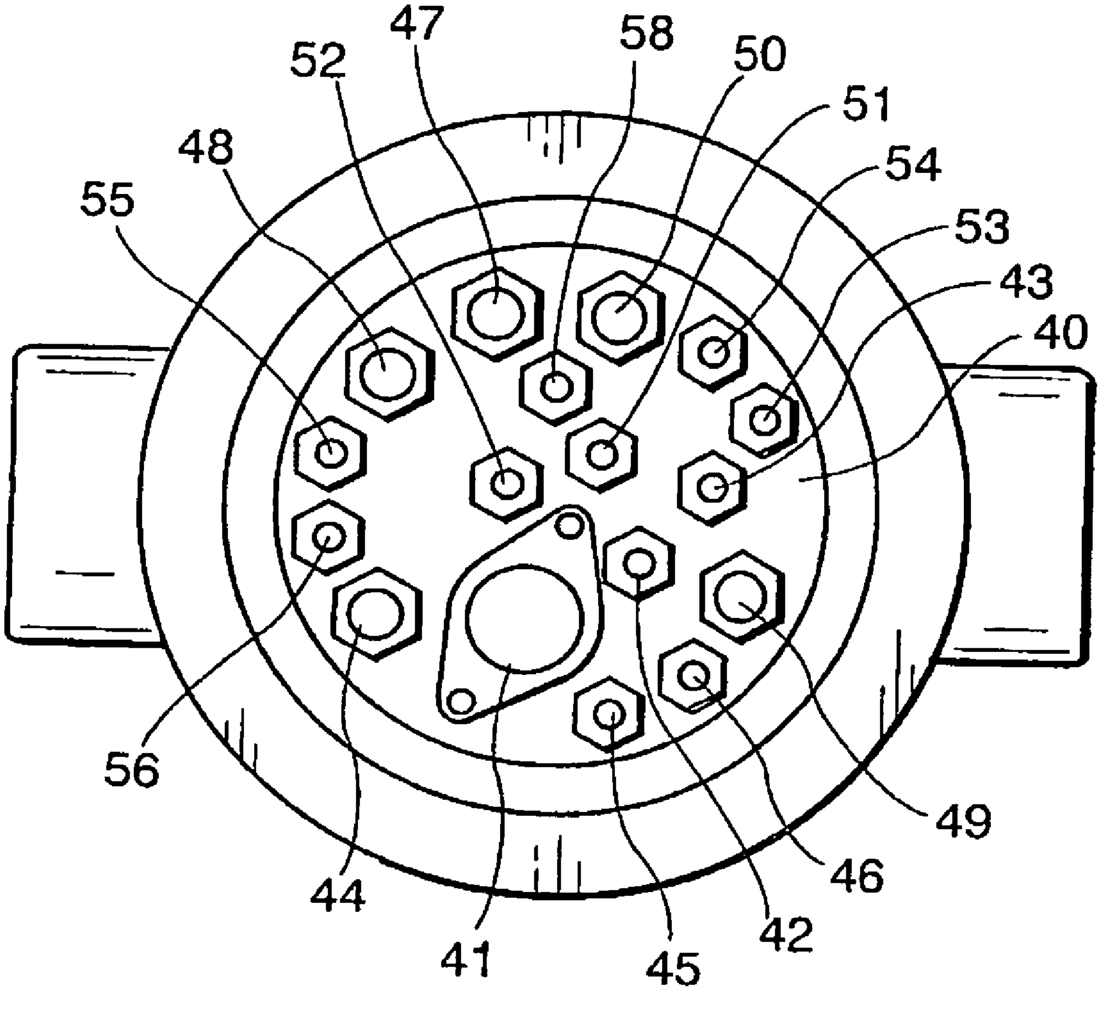
FIG. 3 is a diagram showing a metal back plate defining the back surface of the electrostatic atomizer in the coating system according to the first embodiment.

FIG. 3 is a back view of the electrostatic atomizer 2 according to the first embodiment. The electrostatic atomizer 2 has a back plate 40 of a conductive metal. The metal back plate 40 has connection ports 41~58 for the power supply path, paint paths, air paths and signal paths.

The port 41 is used to supply low power of d.c. 20 V to the electrostatic atomizer 2 and to connect a low-voltage cable (LV cable) 13 (see FIG. 1) for extracting various detection signals explained later. The port 42 and the port 43 are associated with the paint paths to supply the paint through the port 42 and return excessive paint to the paint source through the port 43. The ports 44~50 communicate with air ducts and paths. The ports 44~46 of the first group are air supply ports associated with the air turbine 6. The ports 47 and 48 of the second group are air supply ports for air related to the pattern of atomization of the paint. The ports 49 and 50 of the third group are ports related to exhaust air.

Among the air-related paths, the ports 44~46 of the first group are explained in greater detail. The port 44 is used to supply air to the air turbine 6, and communicates with the turbine air supply path 23. The port 45 is used to supply bearing air for supporting the output shaft **6*a* of the air turbine 6 in a floating condition, and communicates with the bearing air supply path 25. The port 46 is used to supply braking air for slowing down or stopping the air turbine 6**.

The ports 47 and 48 of the second group are explained in greater detail. The port 47 is used to supply shaping air and communicates with the shaping air path 29. The port 48 is used to supply purge air and communicates with the purge air path 30.

The ports 51 and 52 are related to a cleansing liquid (thinner in case an oil paint is used). The port 51 is used to supply RIM thinner, and the port 52 is used to supply nose flush thinner.

Figure 4:
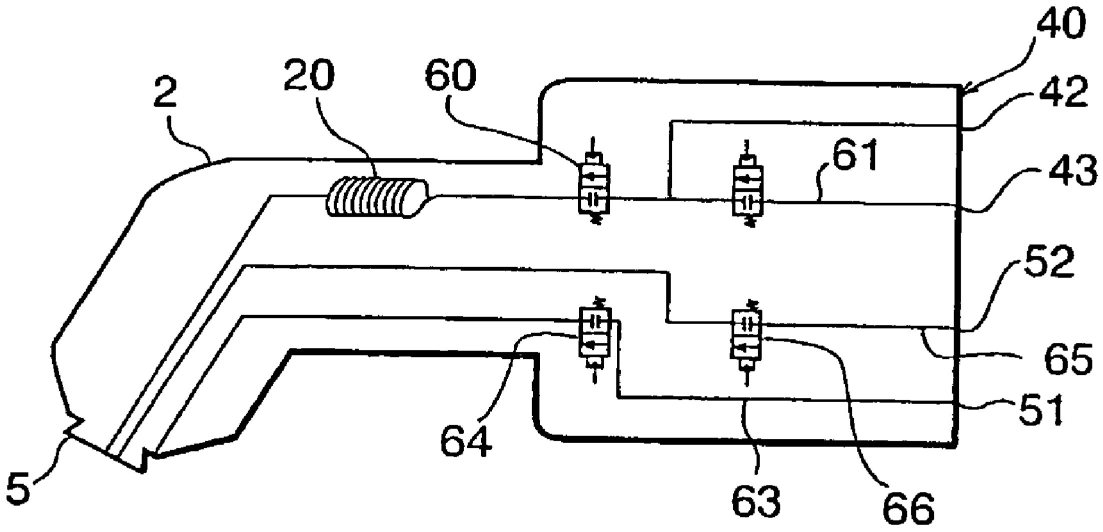
FIG. 4 is a diagram showing an arrangement of paths of liquids (paint and cleansing liquid) in the electrostatic coating system according to the first embodiment.

The ports 53~56 are used to supply trigger air for activating valves provided in the paint supply and return paths and valves provided in thinner supply paths for RIM thinner and nose flush thinner. Among these ports 53~56, the port 53 is used to supply trigger air to a paint valve 60 (see FIG. 4) for dispensing the paint to the rotary atomizer head 5 through the paint supply path 33. The port 54 is used to supply trigger air to a dump valve 62 placed in a return pipe 61 (see FIG. 4) for returning redundant paint to the paint source.

The port 55 is used to supply trigger air to a RIM thinner valve 64 placed in a RIM thinner supply path 63. The port 56 is used to supply trigger air to a nose flush thinner valve 66 placed in a nose flush thinner supply path 65.

The metal back plate 40 further has a port 58 used to extract output from the revolution sensor 32 via the optical fiber cable 33.

With reference to FIG. 5 schematically showing the entire coating system, the controller 11 includes a power converter 110 that converts the commercial AC power supply to the source voltage of a lower voltage level to be supplied to the electrostatic atomizer 2. The low power supply output from the power converter 110 is supplied to the high voltage generator 7 inside the atomizer 2 after being adjusted to a required voltage value in a switching drive 111. The electric power supplied to the high voltage generator 7 undergoes a feedback control by a sensor (voltage value and current value) and a high voltage control circuit (HV control circuit) 113.

The coating line control device 12 supplies the HV control circuit 113 with a designated high voltage value $V_T$ determined by the material, color and other factors of vehicle bodies moving along the coating line. Responsively, the HV control circuit 113 controls the switching drive 111 to adjust the high voltage to be applied to the rotary atomizer head 5 to the designated high voltage value $V_T$.

The high voltage generator 7 inside the atomizer 2 is comprised of a high voltage generator circuit (typically, a Cockcroft-Walton circuit) 701. The high voltage generator 7 receives outputs from the switching drive 111 and an oscillating circuit 114 in the controller 11, and generates a d.c. high voltage. The total supply current $I_1$ supplied from the high voltage generator circuit 701 to the rotary atomizer head 5 and the output high voltage $V_m$ as the high voltage applied to the rotary atomizer head 5 are detected by a total current sensor 115 and a high voltage sensor 116 in the controller 11 via a LV cable 13. Values detected by the sensors 115 and 116 are input to a CPU 117.

The metal back plate 40 of the electrostatic atomizer 2 is in electrical conduction with conductive joints defining the ports 41~58. The total leak current $I_2$ in the internal paths of the atomizer 2, including the power supply path, liquid paths for the paint and the thinner, and air paths for turbine air, trigger air, etc., can be detected by connecting a resistor $R_{i2}$ in the grounding line 702 of the metal back plate 40. The total leak current $I_2$ is detected by a second current sensor 118 in the controller 11 via the LV cable 13, and output of the second current sensor 118 is input to the CPU 117.

Still referring to FIG. 5, the current $I_1$ flowing in the resistor $R_{i1}$ is the total current flowing in the circuit of the electrostatic atomizer 2. The total current $I_1$ is the sum of current $I_3$ not contributing to the coating operation and current $I_4$ contributing to the coating operation. In other words, the high voltage current value $I_4$ contributing to the coating operation equals the value obtained by subtracting the bleed current $I_3$ not contributing to the coating operation from the total current value $I_1$. That is, it can be expressed by Equation (1) shown below.

$$I_4=I_1-I_3 \tag{1}$$

The current $I_5$ flowing in a work W held in the ground potential equals the value obtained by subtracting the total leak current $I_2$ inside the atomizer 2 from the high voltage current value $I_4$ contributing to the coating operation. That is, it can be expressed by Equation (2) shown below.

$$I_5=I_4-I_2 \tag{2}$$

From Equations (1) ad (2), the work current value $I_5$ to be controlled can be expressed by Equation (3) shown below.

$$I_5=I_1-I_2-I_3 \tag{3}$$

In Equation (3), the bleed current value $I_3$ can be obtained by dividing the high voltage output value $V_m$ of the high voltage generator circuit 701 by resistance $R_m$ ($I_3=V_m/R_{br}$).

Therefore, the work current value $I_5$, which is the target of the control, can be expressed by Equation (4) shown below.

$$I_5=I_1-I_2-V_m/R_{br} \quad (4)$$

Electrical leakage inside the atomizer 2 occurs mainly in air paths and liquid paths. Referring again to FIG. 5, reference numerals 201~214 denote sensors individually associated with the respective ports 41~58 communicating with the respective paths. The sensors 201~214 can be made by independently grounding the individual ports and connecting independent resistors in the individual grounding lines. Leak current values detected by individual sensors 201~214 are input respectively to the CPU 117. The total leak current $I_2$ explained above is equal to the total of the leak current values detected by the individual sensors 201~214.

The high voltage control by the controller 11 in the electrostatic coating system 1 according to the first embodiment is doubly executed from two different aspects. Substantially, the first high voltage control is an automatic control of the work current $I_5$. An example of this control is shown in the flow chart of FIG. 6. The second high voltage control is an automatic control of the leak current $I_2$ substantially. An example of this control is shown in the flow chart of FIG. 7.

The control of the work current as the first high voltage control is explained with reference to the flow chart of FIG. 6. First in step S1, a first set value, i.e. a first threshold value $I_a$, is acquired. In the next step S2, the total current value $I_1$ detected by the total current sensor 115, total leak current value $I_2$ detected by the second current sensor 118 and the output voltage $V_m$ detected by the high voltage sensor 116 are acquired.

In the next step S3, $I_1$, $I_2$ and $V_m$ acquired in step S2 are arithmetically operated by Equation (4) shown above to obtain a work current value $I_5$. In the next step S4, the work current value $I_5$ is compared with the first threshold value $I_a$. If the work current value $I_5$ is larger than the first threshold value $I_a$, it is decided that electrical discharge has occurred between the atomizer 2 and the work W, and the flow moves to step S5. In step S5, an alarm is given to the operator with an alarm lamp, for example. In the next step S6, an allowable range of high voltage (typically an allowable percentage relative to a reference level) previously registered in the controller 11 is acquired. Thereafter, in step S7, it is checked whether the output high voltage $V_m$ is within the allowable range or not. If the answer of step S7 is NO, which means that the output high voltage $V_m$ is below the allowable range, the flow moves to step S8 to activate the safety mechanism. That is, application of the high voltage to the rotary atomizer head 5 is interrupted by interruption of the power supply to the high voltage generator 7, for example. If the answer of step S7 is YES, which means that the output high voltage $V_m$ is within the allowable range, the flow moves to step S9. In step S9, high voltage control is executed to lower the level of the output high voltage value $V_m$ stepwise by a predetermined value (for example, by 5 kV), and the flow returns to step S1.

After the coating system finishes coating of one vehicle body and starts coating of the next vehicle body, for example, if the answer of step S4 is NO, which means that the work current value $I_5$ is equal to or smaller than the first threshold value $I_a$, the flow moves to step S10 to acquire a designated high voltage value $V_T$. Thereafter, in step S11, it is checked whether the present output high voltage value $V_m$ is approximately equal to the designated high voltage value $V_T$. If the answer of step S11 is NO, the output high voltage value $V_m$ is decided to be far from the designated high voltage value $V_T$, and the flow moves to step S12. In step S12, high voltage control is executed to increase the output high voltage value $V_m$ stepwise by a predetermined value (for example by 2.5 kV). If the check in step S11 results in YES, the present output high voltage value $V_m$ is decided approximately equal to the designated high voltage value $V_T$, and the flow moves to step S13 to release the alarm.

Figure 6:
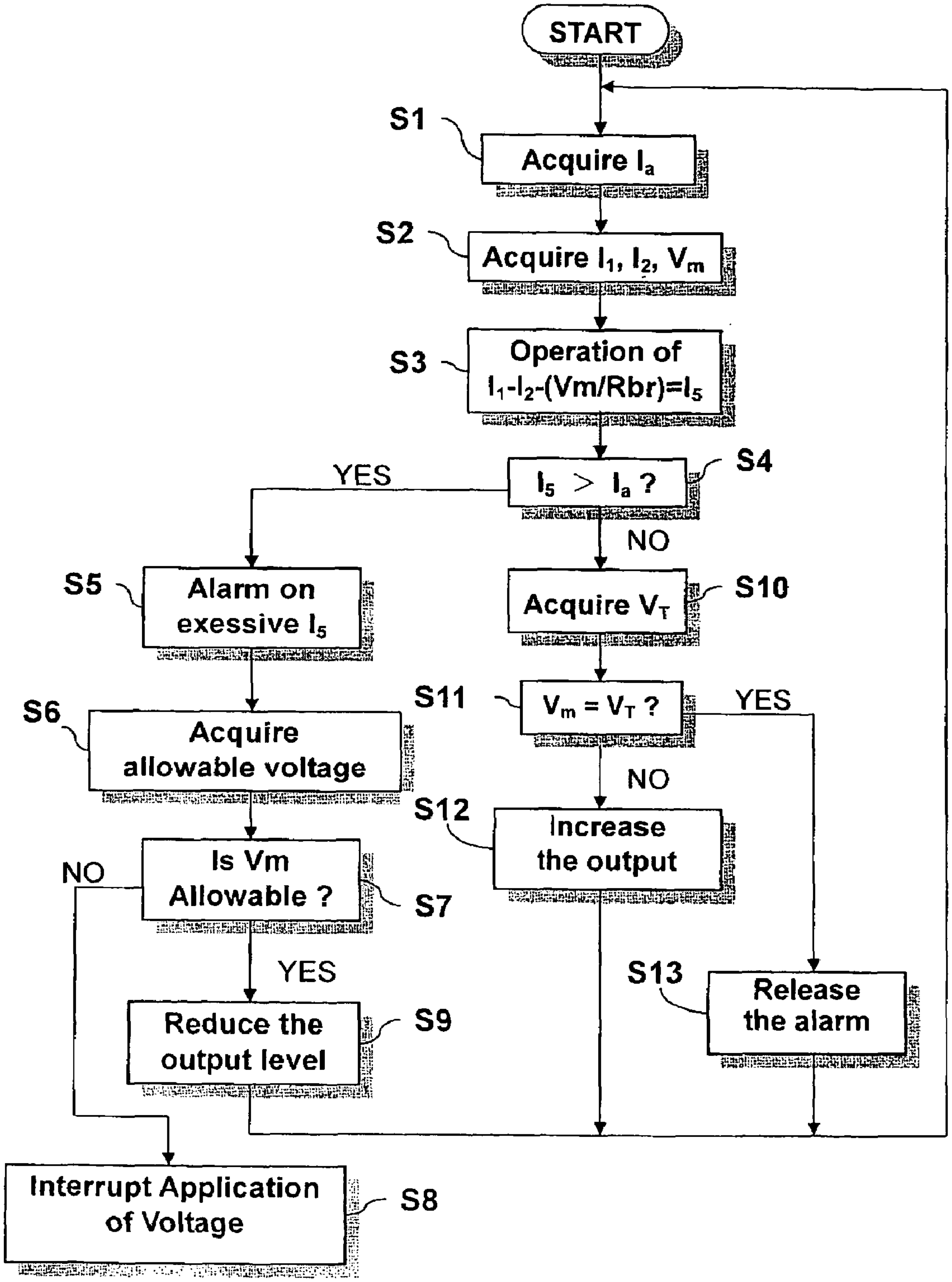
FIG. 6 is a flow chart of a control for optimizing the high voltage output value, based on leak current detected from the high voltage path, liquid paths and air paths in the electrostatic atomizer of the coating system according to the first embodiment.

In short, when an excessive work current $I_5$ flows for a certain reason such as excessive closeness of the rotary atomizer head 5 to the work W, the control shown in the flow chart of FIG. 6 activates the safety mechanism to interrupt the operation of the high voltage generator circuit 701 and to forcibly stop application of the high voltage $V_m$ to the rotary atomizer head 5. On the other hand, if the work current value $I_5$ remains in the allowable range, the control stepwise lowers the high voltage output value $V_m$ by a predetermined value (step S9). Thus, the high voltage applied to the rotary atomizer head 5 is optimized to a level that can lower the work current value to a non-serious level, and the coating operation can be continued under the non-serious level of the work current value $I_5$.

Figure 7:
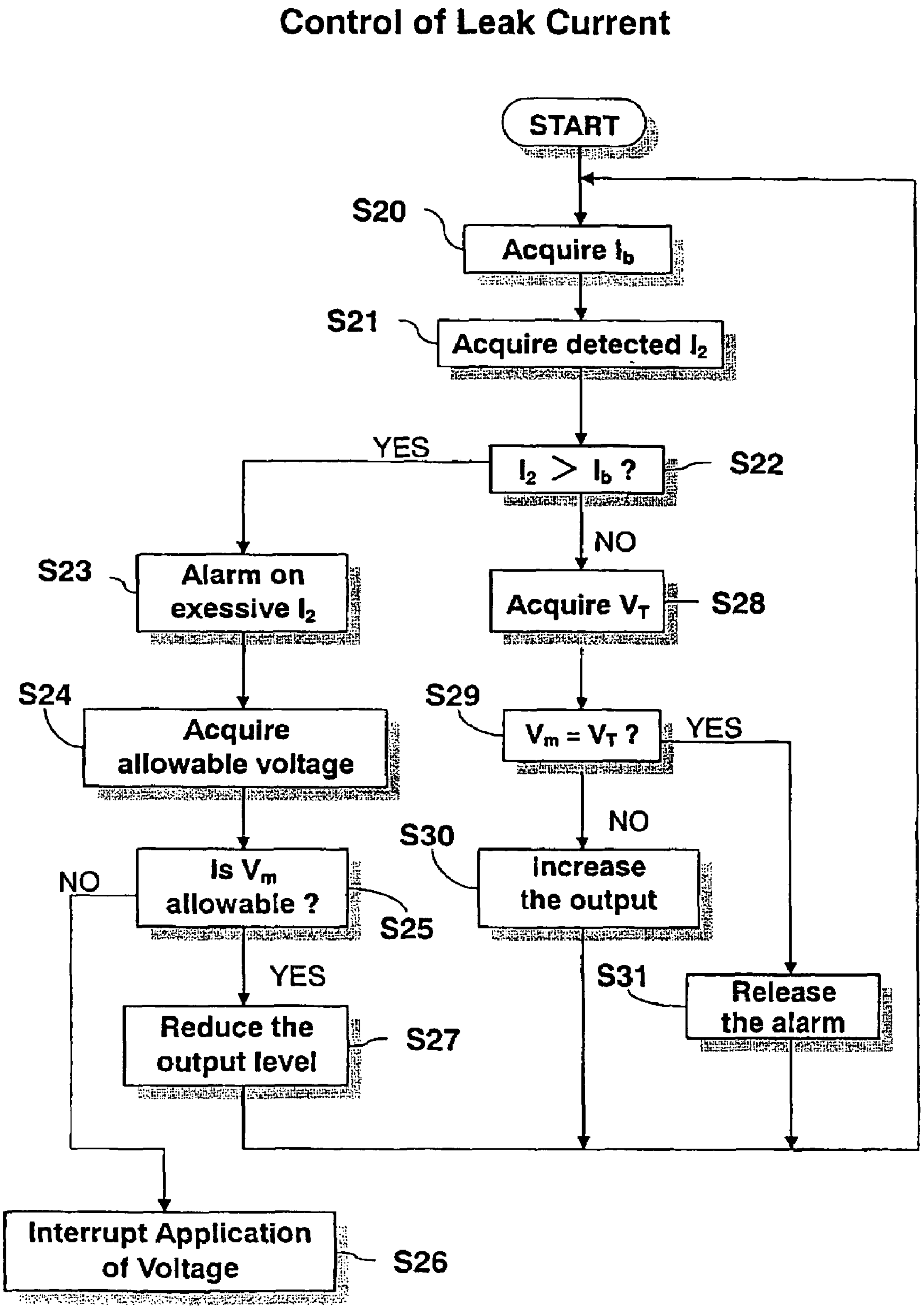
FIG. 7 is a flow chart of a control for optimizing the high voltage output value, based on leak current detected from the liquid paths and air paths in the electrostatic atomizer of the coating system according to the first embodiment.

Next explained is the second high voltage control with reference to the flow chart of FIG. 7. First in step S20, a second set value, i.e. a second threshold value $I_b$, is acquired. In the next step S21, the total leak current value $I_2$, i.e. the total leak current in the liquid paths and the air paths, detected by the second current sensor 118 is acquired. In the next step S22, the total leak current value $I_2$ acquired in step S21 is compared with the second threshold value $I_b$. If the total leak current value $I_2$ is larger than the second threshold value $I_b$, it is decided that excessive leakage of current has occurred inside the atomizer 2, and the flow moves to step 23 to give an alarm to the operator with an alarm lamp, for example. In the next step S24, an allowable range of high voltage (typically an allowable percentage relative to a reference level) previously registered in the controller 11 is acquired. Thereafter, in step S25, it is checked whether the output high voltage $V_m$ is within the allowable range or not.

If the answer of step S25 is NO, which means that the leak current inside the atomizer 2 is large and the output high voltage $V_m$ is below the allowable range, the flow moves to step S26 to activate the safety mechanism. That is, application of the high voltage to the rotary atomizer head 5 is interrupted by interruption of the power supply to the high voltage generator 7, for example. On the other hand, if the answer of step S25 is YES, which means that the output high voltage $V_m$ remains in the allowable range, the flow moves to step S27. In step S27, high voltage control is executed to lower the output high voltage value $V_m$ stepwise by a predetermined value (for example, by 5 kV), and the flow returns to step S20.

After the coating system finishes coating of one vehicle body and starts coating of the next vehicle body, for example, if the answer of step S22 is NO, which means that the total current value $I_2$ is equal to or smaller than the second threshold value $I_b$, the flow moves to step S28. In step S28, a designated high voltage value $V_T$ is acquired. In the next step S29, it is checked whether the present output high voltage value $V_m$ is equal to the designated high voltage value $V_T$. If the answer of step S29 is No, it is decided that the output high voltage value $V_m$ is far from the designated high voltage value $V_T$, and the flow moves to step S30. In step S30, voltage control is executed to increase the output high voltage value $V_m$ by a predetermined value (for example, by 2.5 kV). If the answer of step S29 is YES, it is decided that the present output high voltage value $V_m$ is approximately equal to the designated high voltage $V_T$, and the flow moves to step S31 to release the alarm.

In short, when excessive total leak current $I_2$ is detected inside the electrostatic atomizer 2, the control shown in the flow chart of FIG. 7 results in forcible interruption of the high voltage $V_m$ supplied to the rotary atomizer head 5. However, if the total leak current value $I_2$ is not so large, the control stepwise lowers the output high voltage $V_m$ by a predetermined value (step S27). Thus, the value of the high voltage applied to the rotary atomizer head 5 is optimized to bring the total leak current value $I_2$ to a non-serious level, and the coating operation can be continued, maintaining the leak current in an immaterial level for the coating operation.

In some of the internal paths of the atomizer 2, there is no danger of fire even when electrical leakage occurs therein. More specifically, leakage of current in air paths is less liable to invite fire. In such paths, electrical leakage does not adversely affect continuous coating operation so much. Therefore, sensitivity to leak current in such paths may be lowered for the control of increasing or lowering the voltage. More specifically, for the control of decreasing or increasing the voltage, a value obtained by subtracting the leak current value in internal air paths, for example, from the total leak current value $I_2$ may be compared with the threshold value ($I_a$ or $I_b$). Alternatively, for the control of decreasing or increasing the voltage, a value obtained by subtracting the leak current value in the internal air paths weighted by a certain value (smaller than 1) from the total leak current value $I_2$ may be compared with the threshold value ($I_a$ or $I_b$).

The sensors 201~214 can independently detect leak current in their associated air paths and liquid paths inside the electrostatic atomizer 2. Therefore, regarding specific paths less liable to invite accidents from leak current therein, the sensitivity to the leak current may be disregarded or weighted by a value smaller than 1 for the control of activating the safety mechanism and interrupting the power supply to stop application of the high voltage to the rotary atomizer head 5 (step S25 of FIG. 7), for example.

A display 14 may be used in combination with the sensors 201~214 capable of independently detecting leak current in the individual associated air paths and liquid paths inside the electrostatic atomizer 2. In this case, in receipt of signals from the individual sensors 210~214, the display 14 can display outstanding leak current values and sources of the leakage, for example. Thus, the operator is immediately informed of the path or paths inside the atomizer 2 as the source or sources of the leakage.

The first embodiment explained heretofore has been directed to the electrostatic atomizer 2 having the built-in high voltage generator 7. The configuration of the first embodiment related to the present invention is similarly applicable to an electrostatic atomizer having an external high voltage generator.

Second Embodiment

FIG. 8

Figure 8:
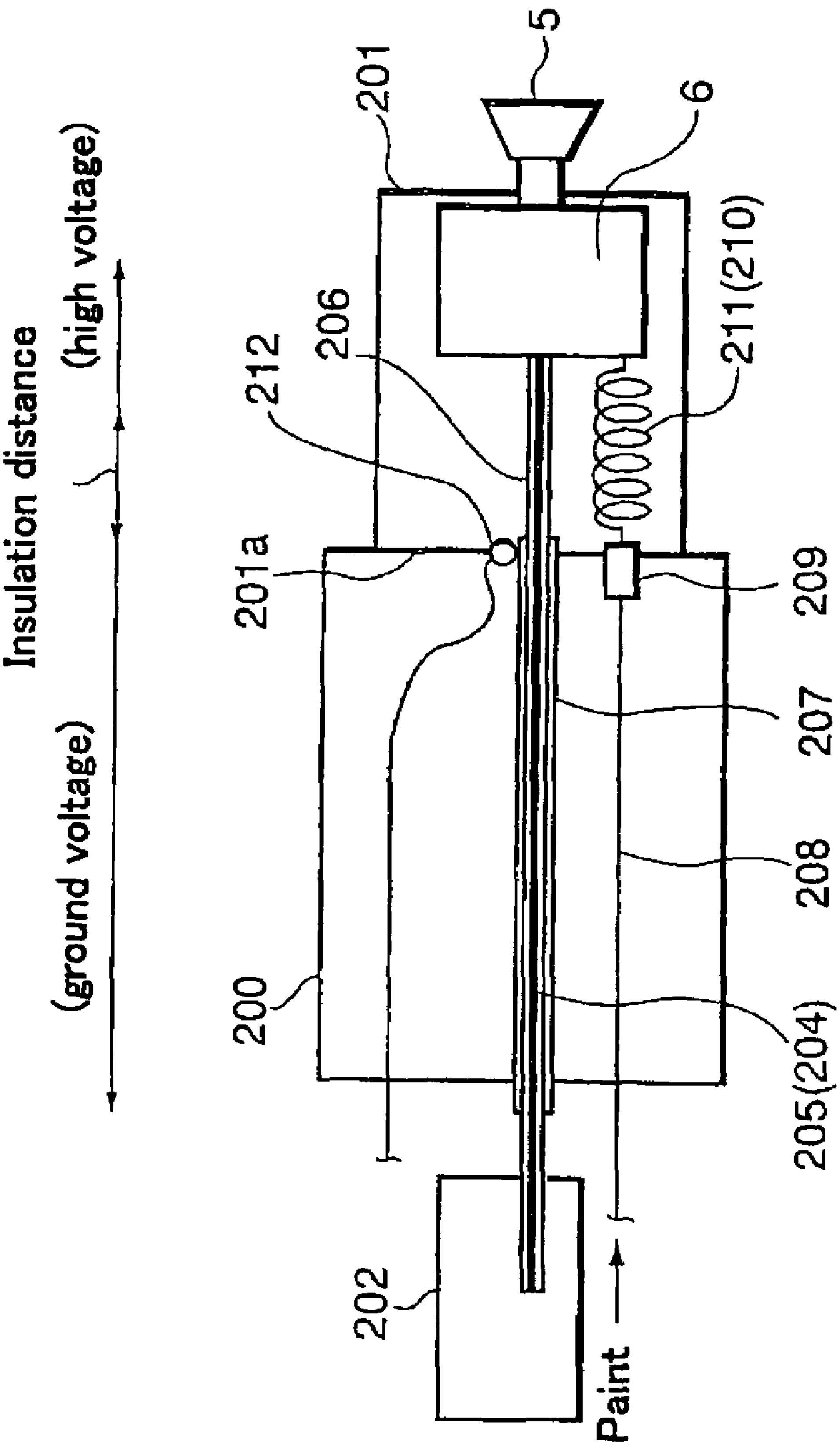
FIG. 8 is a diagram schematically illustrating an electrostatic coating system according to the second embodiment of the invention, including an electrostatic atomizer supplied with a high voltage from an external high voltage generator.

FIG. 8 shows a general aspect of a coating system according to the second embodiment, including an electrostatic atomizer 201 attached to a distal end of a robot arm 200. The electrostatic atomizer 201 in this embodiment is supplied with a high voltage from an external high voltage generator 202. That is, the high voltage generated in the external high voltage generator 202 is supplied to the electrostatic atomizer 201 via a high voltage cable 204 passing through the robot arm 200. The high voltage cable 204 is comprised of a core wire 205, an insulating layer 206 covering the core wire 205 and an outer shield 207 covering the insulating layer 206.

The electrostatic atomizer 201 further includes a paint supply path 210 connected to a paint supply tube 208 via a metal joint 209. The paint supply path 210 includes a helical paint tube 211 as a part thereof.

On the back surface 201*a* of the electrostatic atomizer 201, a leak sensor 212 is provided for detecting electrical leakage from the high voltage cable 204. Similarly to the electrostatic atomizer used in the coating system according to the first embodiment, the electrostatic atomizer 201 used here has air paths and cleansing liquid (thinner) paths, not shown in FIG. 8. Sensors for detecting electrical leakage from these paths are also provided on the back surface 201*a*. The robot arm 200 in contact with the back surface 201*a* of the electrostatic atomizer 201 is the grounded part of the coating system whereas the part from the back surface 201*a* of the electrostatic atomizer 201 to the rear end of the air motor 6 is the insulating part of the coating system. When the leak sensor 212 for detecting electrical leakage from the high voltage cable 204, for example, detects electrical leakage caused by contamination, etc. of the insulated part, the same control as that of the first embodiment is carried out.

The paint having supplied to the rotary atomizer head 5 through the paint supply tube 204 and the paint supply path 210 is electrically charged by the high voltage that is generated in the external high voltage generator 202. However, the high voltage for charging the atomized paint is undesirably applied to the paint inside the paint path 210 and the paint supply tube 208 as well. Therefore, if the paint supply tube 208 contacts a grounded object, the solid of the tube 208 may run to dielectric breakdown. In this case, a part of the paint will leak from the punctured portion of the tube 208 and will generate sparks that may lead to fire. Therefore, the coating supply tube 208 is preferably grounded at the distal end surface of the robot arm 200. However, if the paint supply path 210 extends straight, electrical leakage via the paint itself will increase in case the paint has a low electrical resistance, and the intended high voltage necessary for charging the atomized paint may not be obtained.

In the second embodiment, since the part 211 of the paint supply path 210 is helical as shown in FIG. 8, the resistance of the paint inside the atomizer 201 can be increased substantially, and the electrical leakage through the paint itself can be reduced.

Also when the insulating layer 206 of the high voltage cable 204 has any cracks or other damage, breakdown may occur from the cracks toward the nearest grounded object, such as the paint inside the paint supply tube 208. In this case, the paint may leak from punctured portions of the paint supply tube 208 and may invite the problems of sparks or the like. In the second embodiment, however, the outer shield 207 protectively covers the high voltage cable 204 and prevents influences of the high voltage to the exterior of the paint supply tube 208.

Heretofore, the first and second embodiments have been explained as being application of the invention to electrostatic coating systems including electrostatic atomizers with rotary atomizer head. However, the skilled person in the art will readily understand that the invention is applicable to coating systems including spray type electrostatic atomizers as well.

What is claimed is:

1. An electrostatic coating system including an electrostatic atomizer for coating a work with paint electrically charged by application of a high voltage, the atomizer having a back plate which has a connection port for an air path comprising:

leak detecting means exclusively associated with the connection port for detecting electrical leakage in an internal part of the air path of the electrostatic atomizer independently from electrical leakage in other air or liquid paths; and voltage control means for lowering the level of the high voltage when electrical leakage occurs in the internal part of the air path in accordance with a signal from the leak detecting means.

2. An electrostatic coating system including an electrostatic atomizer for coating a work with paint electrically charged by a high voltage, the atomizer having a back plate which has first connection ports for air paths and second connection ports for liquid paths comprising:

first leak detecting means associated with the first connection ports for detecting electrical leakage in internal parts of the air paths independently from electrical leakage in any other paths;

second leak detecting means associated with the second connection ports for detecting electrical leakage in internal paths of the paint paths independently from electrical leakage in any other paths; and voltage control means for lowering the level of the high voltage when electrical leakage occurs in the internal part of any of the air paths or in the internal part of any of the liquid paths in accordance with a signal from the leak detecting means.

3. The electrostatic coating system according to claim 2 wherein the first and second leak detecting means include a plurality of sensors which are provided in individual association with individual air paths and liquid paths of the electrostatic atomizer, and wherein the electrostatic coating system further comprises a display for displaying one or more of the paths where electrical leakage currently occurs.

4. The electrostatic coating system according to claim 2 wherein the control by the voltage control means is executed by lowering the sensitivity to electrical leakage in the air paths.

5. An electrostatic coating system including an electrostatic atomizer for coating a work with paint electrically charged by a high voltage, the atomizer having a back plate which has connection ports for an electric power supply path, paint paths and air paths comprising:

a plurality of leak detecting means individually associated with the connection ports for detecting electrical leakage in individual internal parts of said paths inside the electrostatic atomizer independently from each other; and a safety mechanism supplied with a signal from the leak detecting means to interrupt application of the high voltage when the total value of electrical leakage inside the electrostatic atomizer is larger than a predetermined value, wherein, for controlling the interruption of the power supply by the safety mechanism, sensitivity to electrical leakage is lowered if the electrical leakage occurs in one or more of the internal parts of the paths giving less influence to safety of the electrostatic coating system even in the presence of electrical leakage.

6. The electrostatic coating system according to claim 5 wherein the interruption of application of the high voltage by the safety mechanism is controlled based on a value obtained by subtracting the electrical leakage in said one or more internal parts of the paths from the total electrical leakage in the electrostatic atomizer.

7. An electrostatic coating system including an electrostatic atomizer for coating a work with a paint electrically charged by a high voltage applied to an electrode, the atomizer having a back plate which has connection ports for an electric power supply path, paint paths and air paths comprising:

total current detecting means for detecting the total current ($I_1$) flowing in a high voltage supply path for applying the high voltage to the electrode;

bleed current detecting means for detecting bleed current ($I_3$);

leak current detecting means associated with the connection ports for detecting leak current ($I_2$) inside the electrostatic atomizer, wherein the leak current detecting means is composed of total leak current detecting means for detecting the total leak current inside the electrostatic atomizer;

independent leak current sensors individually associated with a power supply path, paint paths and air paths inside the electrostatic atomizer respectively;

arithmetic operation means for obtaining work current ($I_5$) flowing between the electrode and the work by subtracting the bleed current ($I_3$) and the leak current ($I_2$) from the total current ($I_1$); and voltage control means for lowering the level of the high voltage supplied to the electrode when the work current ($I_5$) is larger than a first threshold value.

8. The electrostatic coating system according to claim 7 further comprising power interrupting means for interrupting application of the high voltage to the electrode when the work current ($I_5$) is larger than a second threshold value larger than the first threshold value.

9. The electrostatic coating system according to claim 7 further comprising display means for displaying one or more of the power supply path, paint paths and air paths in which leak current has been detected by the associated sensor.

10. The electrostatic coating system according to claim 7 wherein, for calculation of the work current ($I_5$), the leak current detected by any of the leak current sensors associated with said one or more of the paths giving less influence to safety of the electrostatic coating system is weighted by a value less than 1.

11. The electrostatic coating system according to claim 7 wherein the paint paths include a paint supply path, and the paint supply path includes a helical tube as a part thereof.

12. The electrostatic coating system according to claim 11 wherein the power supply path is a high voltage cable covered by an additional outer shield.

13. The electrostatic coating system according to claim 1, wherein the electrostatic atomizer comprises an additional internal path and the back plate has an additional connection port individually communicating with the additional internal path, and an additional leak detecting means associated with the additional connection port for detecting electrical leakage in an internal part of the additional internal path of the electrostatic atomizer independently from electrical leakage in other air or liquid paths.

14. The electrostatic coating system according to claim 1, wherein the back plate comprises a conductive metal back plate.

15. The electrostatic coating system according to claim 1, wherein the back plate further comprises connection ports for a power supply path and paint paths.

* * * * *

UNITED STATES PATENT AND TRADEMARK OFFICE

CERTIFICATE OF CORRECTION

PATENT NO. : 7,617,997 B2
APPLICATION NO. : 10/944250
DATED : November 17, 2009
INVENTOR(S) : Kimiyoshi Nagai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 97 days.

Signed and Sealed this

Nineteenth Day of October, 2010

David J. Kappos

*Director of the United States Patent and Trademark Office*